United States Patent [19]

Saridakis

[11] 3,926,673

[45] Dec. 16, 1975

[54] METHOD AND APPARATUS FOR CHARGING ZINC ELECTRODES IN GALVANIC CELLS

[75] Inventor: Nikolaus Saridakis, Braunschweig, Germany

[73] Assignee: Volkswagenwerk Aktiengesellschaft, Wolfsburg, Germany

[22] Filed: July 29, 1974

[21] Appl. No.: 492,694

[30] Foreign Application Priority Data

Aug. 23, 1973  Germany............................ 2342579

[52] U.S. Cl..................................... 136/31; 136/76
[51] Int. Cl.²......................................... H01M 41/00
[58] Field of Search ......... 136/6 R, 30, 166, 31, 76; 320/2, 46

[56] References Cited
UNITED STATES PATENTS

| | | |
|---|---|---|
| 3,238,437 | 3/1966 | Foster et al............................ 320/2 |
| 3,359,136 | 12/1967 | Merten et al...................... 136/30 X |
| 3,514,333 | 5/1970 | Novack........................... 136/166 X |
| 3,647,548 | 3/1972 | Andersson et al.............. 136/166 X |
| 3,652,431 | 3/1972 | Reynolds........................ 136/166 X |
| 3,701,684 | 10/1972 | De Rossi................................ 136/30 |

Primary Examiner—John H. Mack
Assistant Examiner—C. F. Lefevour
Attorney, Agent, or Firm—Brumbaugh, Graves, Donohue & Raymond

[57] ABSTRACT

A method and apparatus for charging a zinc electrode utilized as an anode in a galvanic cell. In accordance with the invention, the surface of the zinc electrode is flushed with a gaseous agent, introduced from outside the galvanic cell, while the cell is charged to achieve a uniform and compact deposition of metallic zinc on the zinc electrode.

9 Claims, 1 Drawing Figure

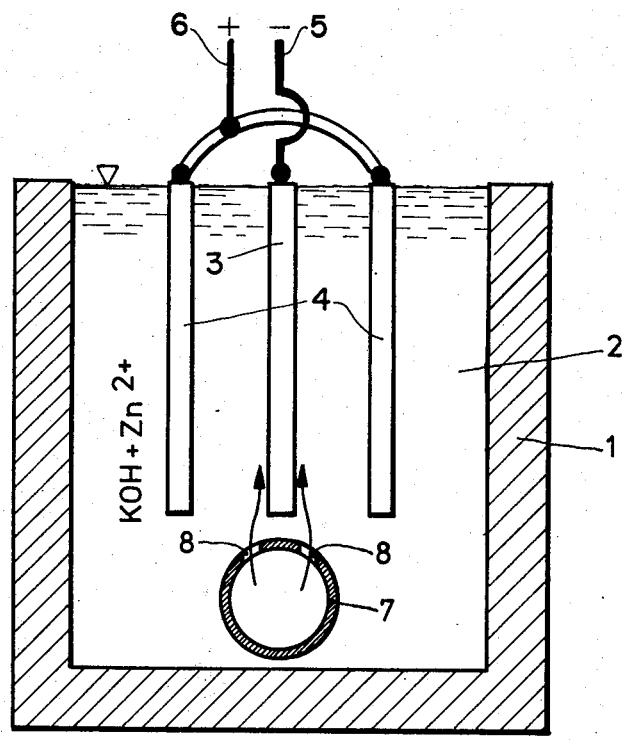

METHOD AND APPARATUS FOR CHARGING ZINC ELECTRODES IN GALVANIC CELLS

BACKGROUND OF THE INVENTION

The present invention concerns a method and apparatus for charging zinc electrodes which are used as anodes in galvanic cells.

Zinc constitutes an especially good material for negative electrodes (anodes) of galvanic cells because zinc has a very favorable electrochemical behavior as well as a high specific capacity (approx. 833Ah/kg.). Moreover, zinc can be purchased on the market at low cost and in sufficient quantity.

A significant disadvantage of the use of zinc as an anode material for galvanic cells, operating with alkaline electrolytes such as KOH, however, lies in the manner in which metallic zinc is deposited on the anode while the cell is being charged. The zinc is not deposited in compact form but rather in a spongy voluminous structure which, in addition, is distributed nonuniformly over the anode surface. As the zinc is deposited, dendrites — i.e., local accumulations of active material — are formed; these dendrites grow very rapidly and eventually lead to a short circuit with the counterelectrode. Moreover, the metallic zinc preferentially accumulates on the lower half of the electrode, resulting in a shape change which cannot be reversed by normal discharge of the cell. Thus, the zinc electrode may grow as far as the counterelectrode, causing a short circuit even after a few cycles.

Known measures for improving the zinc deposit on the anode of galvanic cells, such as agitation or circulation of the electrolyte, doping of the electrolyte, etc., have not overcome these disadvantages.

SUMMARY OF THE INVENTION

It is therefore an object of the present invention to provide a method and an apparatus for charging zinc electrodes which largely overcome the above-mentioned phenomena and which result in a compact and uniform zinc deposit on the zinc electrodes.

This object, as well as other objects which will become apparent in the discussion that follows, are achieved, in accordance with the present invention, in that during the charging process, the zinc electrode (anode) is flushed with a gaseous agent that is introduced from outside the cell.

In a preferred embodiment of the method in accordance with the invention, the zinc electrode is flushed with compressed air directed upward from a point below its lower edge.

Use of the method according to the present invention results in a compact deposit of metallic zinc on the anode of a galvanic cell, while avoiding the formation of dendrites and electrode shape changes. Thus, a substantial increase in the number of cycles of charging and discharging of the galvanic cell may be attained in a very simple manner and at low cost. The present invention therefore makes possible the effective use of zinc electrodes in secondary cells with their very favorable characteristics so to specific capacity and price.

For realization of the method in accordance with the invention the galvanic cell is provided with an arrangement having outlet openings for introducing a gaseous agent from outside the cell. The outlet openings are dimensioned and arranged in such a manner that the entire anode surface is uniformly flushed with the gaseous agent.

In an especially simple and effective arrangement, the outlet openings are arranged in a conduit placed in the galvanic cell underneath the anode, which conduit can be connected with a source of compressed air.

BRIEF DESCRIPTION OF THE DRAWINGS

The single FIGURE in the drawing is a cross-sectional view through a galvanic cell provided with a zinc anode.

DESCRIPTION OF THE PREFERRED EMBODIMENTS

The drawing shows a housing 1 of a galvanic cell having an electrolyte 2, for example comprising potassium hydroxide (KOH), to which is added a zinc salt or zinc oxide. A negative electrode or anode 3 and two positive electrodes or cathodes 4, arranged at a distance from the anode, are connected via electric wires 5 and 6 with a source of direct current, not shown, for charging the galvanic cell. The electrode 3 consists of a support material, such as a nickel wire mesh, coated with metallic zinc.

During the charging process metallic zinc is deposited on the electrode 3. The zinc returns to solution during the discharge of the galvanic cell.

In order for the deposit of metallic zinc on the electrode 3 to be as uniform as possible and, more significantly, to have a compact structure, a gas conduit 7 is arranged underneath the anode 3. This gas conduit 7 is connected to a source of compressed air and provided with a plurality of outlet openings 8 directed upwardly towards the anode. The compressed air is discharged into the electrolyte through these outlet openings 8, and flows around the anode, maintaining a flushing action on the anode. The size of the outflow openings 8 as well as their number and arrangement are suitably chosen in such a manner that the entire surface of the anode is uniformly flushed with the compressed air.

It has been discovered that, by means of an arrangement of the type described above, it is possible to attain a very uniform and compact deposit of metallic zinc on the anode of a galvanic cell, resulting in a compact zinc electrode with high density of energy and power as well as a very large number of possible charge and discharge cycles.

Although the foregoing description does not specify the material of the positive electrodes 4, it is evident that any positive electrode which is usable in a galvanic cell operating with alkaline electrolytes can be employed in accordance with the present invention. For example nickel ($NiO(OH)$) electrodes, air or oxygen electrodes can be used as positive electrodes. These and other electrodes as well as other alkaline electrolytes which are usable with a zinc anode in a galvanic cell are disclosed in S. Falk and A. Salkalind "Alkaline Storage Batteries" (John Wiley & Sons Inc. New York — London — Sydney — Toronto).

It will be understood that the above described embodiments are merely exemplary and that persons skilled in the art may make many variations and modifications without departing from the spirit and scope of the invention. All such modifications and variations are intended to be included within the scope of the invention as defined in the appended claims.

I claim:

1. A process for charging a zinc electrode utilized as an anode immersed in a zinc-containing electrolyte in a galvanic cell, comprising the steps of:
   a. applying a voltage to the zinc electrode; and
   b. simultaneously flushing the surface of said zinc electrode with a gaseous agent that is introduced from outside the galvanic cell.

2. The process defined in claim 1, wherein said gaseous agent is air.

3. The process defined in claim 1, wherein said gaseous agent is directed under pressure across said surface of said zinc electrode.

4. The process defined in claim 1, wherein said gaseous agent is introduced in the galvanic cell at a point below said zinc electrode,
   whereby the natural buoyancy of said gaseous agent causes said agent to rise in the cell electrolyte.

5. Apparatus for charging a zinc electrode utilized as an anode immersed in a zinc-containing electrolyte in a galvanic cell, said apparatus comprising, in combination:
   a. means for applying a voltage to said zinc electrode;
   b. source means for supplying a gaseous agent to the galvanic cell from outside the cell; and
   c. means, connected to said source means, for flushing the surface of said zinc electrode with said gaseous agent.

6. The apparatus defined in claim 5, wherein said flushing means includes a plurality of openings for the outflow of said gaseous agent, said openings being located at least at a point below said zinc electrode.

7. The apparatus defined in claim 6, wherein said openings are so arranged and dimensioned as to provide a substantially uniform flushing of the entire surface of said zinc electrode.

8. The apparatus defined in claim 6, wherein said flushing means includes a gas conduit arranged beneath said zinc electrode in the galvanic cell, said gas conduit having a plurality of openings for the outflow of gas.

9. The apparatus defined in claim 5, wherein said source means includes a source of compressed air.

* * * * *